United States Patent Office 2,776,472
Patented Jan. 8, 1957

2,776,472
METHOD OF MAKING A CERAMIC-TO-METAL BOND

Harry F. Mesick, Jr., deceased, late of Schenectady, N. Y., by Edith M. Mesick, administratrix, Cobleskill, N. Y., assignor to General Electric Company, a corporation of New York No Drawing. Application July 24, 1952,
Serial No. 300,773

4 Claims. (Cl. 29—473.1)

This invention relates to an improved ceramic-to-metal bond and more particularly to an improved method whereby a ceramic may be bonded to another ceramic or to a metal in a gas-tight seal.

Prior to the present invention, a number of methods have been described whereby a metal may be sealed to glass or a ceramic other than glass. For example, Kelley Patent 2,570,248 discloses a method utilizing titanium hydride or zirconium hydride to effect the seal between a metal and a refractory body. In general, the prior art methods of effecting such seals have required careful control and choice of materials.

It is an object of this invention to provide a method whereby a metal may be very tenaciously bonded to a ceramic surface.

It is another object of this invention to provide a method for sealing metals to a wide variety of ceramic surfaces.

It is another object of this invention to provide a method whereby a metallic oxide may be used as the bonding agent in effecting a ceramic-to-metal seal.

Briefly stated, in accordance with one aspect of this invention, molybdenum or tungsten is bonded to a ceramic surface by coating the ceramic surface with an oxide of molybdenum or tungsten and firing the ceramic in a reducing atmosphere.

As used herein, the term "ceramic" is directed toward products produced by mixing and shaping to a particular form various oxides, such as aluminum oxide, silicon oxide, magnesium oxide, sodium oxide, calcium oxide, and others, which are then subjected to a firing treatment in order to produce a final refractory product made up of very coherent particles. A "ceramic body" is understood to be predominantly crystalline with more or less proportion of glassy bond. Its surface may be glazed with a glass coating.

In utilizing this invention to provide a hermetic seal between a metal and a ceramic or a ceramic and another ceramic the ceramic is coated with an adherent layer of molybdenum or tungsten as described above and the thin layer of metal is then utilized as a bonding surface.

It has been mentioned that the thin layer of molybdenum or tungsten metal formed on the outside of the ceramic by his process is very tenacious. An explanation of this phenomenon is that during firing a part of the applied metal oxide or oxides forms a reaction product with the ceramic oxides at the interface, and the remaining part is reduced to metal. This eliminates a sharp boundary between the ceramic and metal oxide with the result that the forces binding the coating to the ceramic are substantially the equal of the forces binding the various particles of ceramic substance to each other. The reducing atmosphere present during the firing operation serves to produce a surface film of reduced metal. Thus, a bore from the surface of the article would pass successively through a thin layer of metal, a layer of metal oxide, a layer of metal oxide+ceramic oxide reaction product, and finally the ceramic material itself. There is no clear interface between layers but a gradual merger of one material into another.

There are a number of molybdenum oxides and tungsten oxides, all of which may be used in his invention. However, it is preferred to use the oxides containing the most oxygen and therefore molybdic oxide ($MoO_3$) and tungstic oxide ($WO_3$) are most satisfactory for this invention.

It has been previously mentioned that the molybdenum or tungsten metal surface produced by his process may be utilized as a bonding surface for a metal member. There are many ways in which the surface may be so utilized. For example, a solder of eutectic silver (72% silver—28% copper) will form a strong hermetic bond. Pure copper, pure lead or pure tin may also be used as may various mixtures of silver, lead, copper, indium, zinc and cadmium. This list of solders is intended to be representative rather than limiting. Many other metal bonding agents may be used. The bond between a metal member and the molybdenum or tungsten surface may be effected by a carefully controlled fusion process carried out in a reducing atmosphere.

In many cases it has been found that a seal may be more easily effected between a metal member and molybdenum or tungsten if the molybdenum or tungsten surface is first coated with copper or nickel. This may easily be done by a second coating over the ceramic coated with an adherent layer of molybdenum or tungsten as described above of copper oxide ($Cu_2O$), nickel oxide or copper or nickel metal either by painting or electrolytically. During the subsequent firing in a reducing atmosphere a thin surface film of nickel or copper is formed overlying the intergrown layers of copper oxide or nickel oxide, molybdenum or tungsten metal and oxides, and various reaction products thereof. A copper or nickel layer thus produced is very tenacious and is more easily wetted by the subsequent solder or brazing metal than molybdenum or tungsten. It need not be thicker than five to ten microns.

In bonding a molybdenum or tungsten surface to a ceramic in accordance with his invention, there is first prepared a liquid suspension of finely divided oxide particles. While molybdic oxide is usually preferable to tungstic oxide, either, or mixtures thereof, may be used. The liquid in which the particles are suspended may be water but a dilute solution of an organic liquid binding material such as varnish, nitrocellulose lacquer, or other natural or synthetic resin, gum or wax which can be volatilized completely without leaving any carbon residue is preferred. The suspension is then applied to the ceramic as by brushing or spraying. A very thin layer of oxide on the ceramic is preferred. As long as the layer entirely covers the ceramic surface to be sealed it is satisfactory for this purpose. Thus, layers of a thickness of the order of a single crystal may be utilized. The ceramic is then placed in an oven and brought up to firing temperature at a rate of temperature increase which is commensurate with the nature and size of the ceramic member. In raising the ceramic to firing temperature care must be taken, particularly in the case of a large ceramic member, to avoid heating at a rate such that uneven heating of the ceramic will cause a fracture. Small ceramic members may be brought up to firing temperature very quickly. Thus, the time of heat treatment may vary from a few minutes to many hours or even days.

The temperatures of the successive heat treatments depend upon the nature of the ceramic. The firing treatment cannot be above the softening point of the ceramic. Thus, a temperature of 900° C. is too high for certain glasses. The more refractory ceramics, based on nearly pure oxides, such as alumina, zirconia, forsterite, or beryllia can withstand a firing temperature of 1750° C. and above. For most ceramics the range of firing temperatures is between 900° C. and 1750° C. but it is to be understood that there is nothing critical about this range and it is dependent on the nature of the ceramic itself. In the case of vacuum-tight high alumina ceramics, 1350° C. has been found to be a satisfactory firing temperature for molybdic oxide. Forsterite ceramics have also been successfully molybdenized at 1350° C.

In order to reduce the exposed surface of molybdenum or tungsten oxide to a metallic state the firing is carried on in a reducing atmosphere. This is easily and readily accomplished by surrounding the ceramic with nearly pure hydrogen. However, other reducing atmospheres, such as mixtures of hydrogen with nitrogen and ammonia, are also satisfactory. When using pure hydrogen, it is preferable to bubble it first through water.

The ceramic does not require any surface pretreatment except cleaning before application of the oxide suspension in liquid binding material. Where it is desired to bond ceramic to ceramic, both ceramic pieces may be put through the process described as part of this invention and the resulting metalized surfaces are then utilized to effect a connection of ceramic to ceramic.

When it is desired to provide a ceramic with a metallic copper surface, the ceramic is first coated with a liquid suspension of finely divided oxide of molybdenum or tungsten and fired in damp hydrogen as described above. The resulting surface tends to exhibit a dull-grey, soft layer of poorly sintered metal particles on top which can be removed by wire brushing or other buffing to expose a coherent, shiny, adherent and continuous thin layer of metal coating over the ceramic surface. A surface layer of finely divided copper oxide (preferably cuprous oxide) suspended in a liquid may then be brushed or sprayed over this buffed surface and fired in a reducing atmosphere to 900° C.–1200° C. preferably 1050° C. for a short time which reduces the oxide to copper and forms a strong bond between this copper and the molybdenized surface.

Ordinarily it is recommended that the molybdic oxide or tungsten oxide powder be ground with the lacquer and solvents in a ball mill or mechanical mortar and pestle until it is very fine. In practice, however, good results have been obtained with suspensions prepared just by stirring the powder as received into the diluted lacquer. The resulting metalizing is lumpy, but since this portion is removed or burnished during the wire-brushing, it has not affected the end result.

The proportions of powder, lacquer, amyl acetate and acetone can be adjusted to give the requisite consistency for brushing, spraying, or silk screening and to give the desired rate of drying.

It has been found possible to introduce only a part of the molybdenum or tungsten as the oxide, the balance as the metal. The minimum firing temperature for adherence increases as the proportion of metal increases and the controls therefore become more stringent.

Likewise other metals, such as copper, nickel, and iron, can be mixed with the powder for special purposes.

A major difference between the molybdic oxide or tungsten oxide process and prior art, is that much thinner applications are used. The thickness can be expressed in terms of weight of coating per unit area. In a controlled series of tests, the strongest seals were obtained at the lowest measured application weight of 6 mg. per sq. cm. of molybdic oxide which yields about 4 mg./sq. cm. of molybdenum metal before wire-brushing. This contrasts with the 20 to 30 mg./sq. cm. for the usual metalizing, and emphasizes the entirely different purpose, mechanism, and structures sought by the molybdic oxide or tungsten oxide procedure. Satisfactory seals are obtained with an application weight of as much as 15 mg. per sq. cm.

In actual thickness the present process has been found to form a metal layer which may be only one to two microns thick as contrasted with the fifteen to twenty-five microns recommended for other processes. Instead of the metal serving as a sintered but still open-structured mass for infiltration by solder metal, in the present process it is ordinarily only a single metal grain thick. Still this condition provides strong bonds to both solder and ceramic.

Since it is the aim of the present process to shift the equilibrium of the reaction $$MoO_3 + H_2 \rightleftarrows Mo + H_2O \text{ or}$$
$$WO_3 + H_2 \rightleftarrows W + H_2O$$

from completion to the right towards an intermediate equilibrium, it is advantageous to use a wet hydrogen atmosphere. However, good results have been obtained with dry hydrogen at a dewpoint of −50° F. (0.01% $H_2O$) or dryer. In critical cases such as inside seals of metal rods within small diameter holes, it has been found helpful to bubble the hydrogen through water before it enters the furnace, thereby raising the dewpoint to +70° F. (2½ percent $H_2O$ by volume).

The maximum firing temperature is limited by the deformation temperature of the ceramic. In general it is true that the higher the firing temperature, the stronger the metal-to-ceramic adherence. However, in the case of refractory ceramics, such as the high alumina class which can be heated as high as 1700° C. without deformation, there seems to be no further advantage derived from firing above about 1400° C.

The rate of heating and cooling and the duration at the maximum temperature are dependent on the size of the ceramic, its sensitivity to sudden temperature changes, and the load in the furnace. Too rapid heating can crack the ceramic and may also give poorer adherence because of too rapid and too complete reduction of oxide. For most work one-half to one hour at maximum temperature is adequate, but prolonged heating has not been harmful.

Wire brushing or buffing is usually advisable to remove any superfluous, poorly sintered molybdenum metal on the outermost layers. As the ceramic surface is approached, denser, more coherent metal is reached which does not rub off, but shines to a bright surface.

In the case of holes too narrow for mechanical brushing or buffing, it has been found sufficient to run steel wool through the holes.

The metalized ceramic can be assembled with the metal or ceramic part and with the braze metal in wire, wafer or lump form in a location where it can flow over the seal areas upon melting.

With pure copper it has been found that the strongest seals are obtained with a braze thickness of 2½ mils (62 microns) or less. This is roughly 30 times the thickness of the metalized layer.

With eutectic silver braze (72% Ag+28% Cu) stronger seals were obtained with greater initial thicknesses.

During brazing the parts being sealed are best kept under a slight pressure, of say one pound per square inch.

The temperature of brazing should be appreciably above the melting point of the braze metal in order to insure good flow, permeation, and bonding. For example, copper brazing is carried out in hydrogen at 1125 to 1150° C., that is 40 to 70° C. above the melting point of copper. The eutectic silver brazing is carried out at 850 to 900° C., that is 70 to 120° C. above its melting temperature.

While the present invention has been described with reference to particular embodiments thereof, it will be understood that numerous modifications may be made by those skilled in the art without actually departing from the invention. Therefore, it is the aim in the appended claims to cover all such equivalent variations as come within the true spirit and scope of the foregoing disclosure.

What is claimed as new and desired to be secured by Letters Patent of the United States is:

1. The method of forming a gas-tight seal between a surface portion of a ceramic body and another body having a metallic surface comprising the steps of applying a coating to said surface portion of less than 15 milligrams per square centimeter of an oxide of a metal selected from a group consisting of molybdenum and tungsten and mixtures thereof, firing the coated ceramic body in a reducing atmosphere to cause a first portion of the applied metal oxide which is in closest proximity to the ceramic surface to react therewith and to cause the remainder of said applied metal oxide overlying said first portion to be reduced to form a metal coating comprising a substantially continuous metal film less than about 10 microns in thickness which is tightly adherent to said reacted ceramic surface, substantially the remainder of said metal coating comprising a soft layer of poorly sintered metal particles overlying said continuous metal film, reducing the thickness of said metal coating by removing the overlying portions thereof until the adherent continuous metal film overlying the reacted ceramic surface is less than about 5 microns in thickness and joining said ceramic body to another body having a metallic surface by placing the surface of the ceramic body bearing the adherent continuous metal film in close proximity to the metallic surface of said other body and causing a molten metal capable of wetting both the metal film and the metallic surface while it is in the molten state to solidify between said film and said surface to thereby bond said film and said surface together to form a gas-tight joint between said ceramic body and said other body.

2. The method recited in claim 1 in which the surface of said ceramic body is coated with about 6 milligrams per square centimeter of molybdenum oxide.

3. The method recited in claim 1 in which the reducing atmosphere consists of hydrogen having a dewpoint of from about −50° F. to about +70° F.

4. The method recited in claim 1 in which the wetting characteristics of the adherent metal film may be improved by applying a thin coating of copper oxide thereover and firing said coated ceramic body in a reducing atmosphere at a temperature from about 900° C. to about 1200° C. for a time sufficient to reduce the copper oxide to form a substantially continuous film of copper extending over and adherent to said adherent metal film.

References Cited in the file of this patent
UNITED STATES PATENTS

| | | |
|---|---|---|
| 1,089,907 | Coolidge | Mar. 10, 1914 |
| 1,884,665 | Greiner | Oct. 25, 1932 |
| 2,139,431 | Vatter | Dec. 6, 1938 |
| 2,163,409 | Pulfrich | June 20, 1939 |
| 2,163,410 | Pulfrich | June 20, 1939 |
| 2,233,622 | Lytle | Mar. 4, 1941 |
| 2,282,106 | Underwood | May 5, 1942 |
| 2,434,555 | Fischer | Jan. 13, 1948 |
| 2,454,270 | Braunsdorf | Nov. 23, 1948 |
| 2,461,878 | Christensen | Feb. 15, 1949 |
| 2,563,391 | Browne | Aug. 7, 1951 |
| 2,564,738 | Tank | Aug. 21, 1951 |
| 2,570,248 | Kelley | Oct. 9, 1951 |
| 2,647,218 | Sorg et al. | July 28, 1953 |

OTHER REFERENCES

Metallizing, Glass and Ceramic Material, B. A. J., Monack, pp. 21–25 and 40–44. Published in the Glass Industry, January 1947.